(12) United States Patent
Xie

(10) Patent No.: US 9,762,543 B2
(45) Date of Patent: Sep. 12, 2017

(54) USING DNS COMMUNICATIONS TO FILTER DOMAIN NAMES

(71) Applicant: Palo Alto Networks, Inc., Santa Clara, CA (US)

(72) Inventor: Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 15/145,723

(22) Filed: May 3, 2016

(65) Prior Publication Data

US 2016/0294877 A1    Oct. 6, 2016

Related U.S. Application Data

(63) Continuation of application No. 13/115,050, filed on May 24, 2011, now Pat. No. 9,467,421.

(51) Int. Cl.
  *H04L 29/06* (2006.01)
  *H04L 29/12* (2006.01)
  *H04L 29/08* (2006.01)

(52) U.S. Cl.
  CPC ...... *H04L 63/0236* (2013.01); *H04L 61/1511* (2013.01); *H04L 63/101* (2013.01); *H04L 63/1416* (2013.01); *H04L 63/1441* (2013.01); *H04L 63/20* (2013.01); *H04L 67/02* (2013.01); *H04L 67/42* (2013.01)

(58) Field of Classification Search
  CPC ..... H04L 63/0236; H04L 67/02; H04L 67/42; H04L 63/20; H04L 63/1441; H04L 63/1416; H04L 63/101; H04L 61/1511
  See application file for complete search history.

(56) References Cited

U.S. PATENT DOCUMENTS

| | | | |
|---|---|---|---|
| 7,181,506 B1 | 2/2007 | Vigue | |
| 7,792,994 B1 * | 9/2010 | Hernacki | H04L 12/66 709/229 |
| 8,447,856 B2 * | 5/2013 | Drako | H04L 29/12066 709/229 |
| 2007/0180090 A1 * | 8/2007 | Fleischman | H04L 29/12066 709/223 |
| 2009/0055929 A1 * | 2/2009 | Lee | H04L 29/12066 726/23 |
| 2009/0249484 A1 * | 10/2009 | Howard | G06F 21/567 726/24 |
| 2010/0318681 A1 * | 12/2010 | Shi | G06F 15/16 709/245 |
| 2010/0319069 A1 * | 12/2010 | Granstedt | H04L 63/0263 726/22 |
| 2011/0035469 A1 * | 2/2011 | Smith | H04L 61/1511 709/220 |

* cited by examiner

*Primary Examiner* — Matthew Smithers
(74) *Attorney, Agent, or Firm* — Van Pelt, Yi & James LLP

(57) ABSTRACT

Using DNS communications to filter domain names is disclosed. A domain name is extracted from a received DNS request. The received DNS request is blocked in response to determining based on a policy that access to the domain name of the DNS request is not permitted. In some cases, such a DNS request is responded to with a spoofed DNS response.

63 Claims, 4 Drawing Sheets

USING DNS COMMUNICATIONS TO FILTER DOMAIN NAMES

CROSS REFERENCE TO OTHER APPLICATIONS

This application is a continuation of U.S. Pat. No. 9,467,421 entitled USING DNS COMMUNICATIONS TO FILTER DOMAIN NAMES filed May 24, 2011 which is incorporated herein by reference for all purposes.

BACKGROUND OF THE INVENTION

Existing content filtering techniques such as URL filtering are typically performed at the HTTP stage of a communication flow. In many such cases, lower level communications may be futilely performed. Moreover, some forms of suspect or malicious activity may not be detectable at the HTTP stage.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Figure 1:
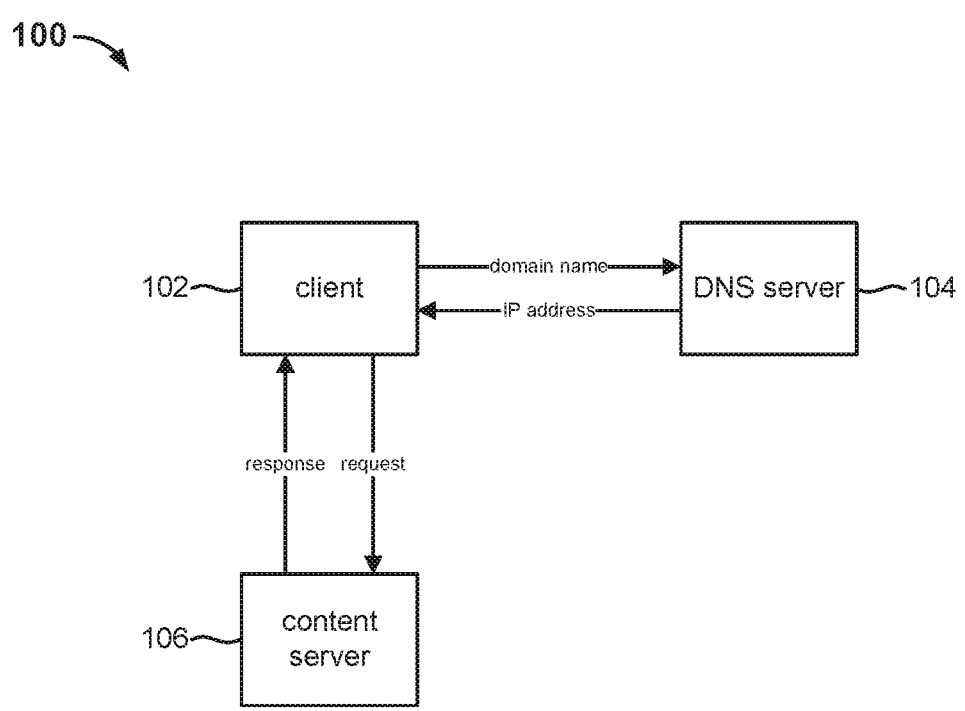
FIG. 1 is a high level block diagram illustrating exemplary communications involved in fulfilling a client request for a resource.

FIG. 1 is a high level block diagram illustrating exemplary communications involved in fulfilling a client request for a resource. The various components comprising network environment 100 communicate via one or more private and/or public networks using any appropriate communication protocols. In one example, a URL (Uniform Resource Locator) is input into a web browser at client 102 to retrieve a desired resource. In such cases, the web browser of client 102 forwards a request to a DNS (Domain Name System) server 104 to resolve the domain name of the URL into a corresponding IP (Internet Protocol) address. DNS server 104, for example, may comprise a name server that client 102 has been configured to use to resolve domain names into corresponding IP addresses. If a mapping of the requested domain name to an IP address already exists (e.g., is cached) at DNS server 104 or is determined by DNS server 104 by contacting one or more other name servers of the Domain Name System, DNS server 104 responds by providing the corresponding IP address to client 102 as depicted in the given example. In some cases, DNS server 104 may comprise a name server to which client 102 has been redirected. For example, if a mapping of a requested domain name to an IP address does not already exist at a DNS server to which the request is originally forwarded, that DNS server may respond to client 102 with an IP address of another DNS server 104 that may be capable of resolving the desired domain name. If the requested domain name is not registered with the Domain Name System, an error message is provided to client 102 by DNS server 104 indicating that the requested domain name is invalid or does not exist. Client 102 and DNS server 104 may communicate, for example, using DNS protocols or messaging. In response to receiving a valid IP address for a requested domain name, client 102 connects to a corresponding content server 106 using the IP address to request a desired resource. Content server 106 responds with the requested resource if the requested resource is available at content server 106 or responds with an error message or with a redirect to another content server if the requested resource is not available at content server 106. Client 102 and content server 106 may communicate using any one or more appropriate protocols such as HTTP (HyperText Transfer Protocol), SSL (Secure Sockets Layer), FTP (File Transfer Protocol), etc.

It is generally desirable to prevent a client from becoming infected by malware and to determine when a client has become infected by malware so that the malware can be removed from the client as soon as possible. A compromised client, for example, may at least in part be identified by its communications or attempted communications with an associated command and control server. Content filtering, including URL filtering, may be employed to detect and block communications with known malicious domains by monitoring HTTP communications initiated by a client. In many cases, it may be advantageous to monitor communication protocols other than HTTP so that attempted malicious activity can be detected and blocked potentially earlier. As disclosed herein, in some embodiments, DNS communications are monitored and analyzed to detect and block attempted communications with suspect or known malicious domains. Clients attempting such communications may be scanned for malware and/or sanitized if found to be infected. Moreover, DNS communications may further be employed to implement corporate policies such as restricting various users from accessing certain categories of web sites.

The monitoring of DNS communications may be useful for identifying attempted connections to malicious domains that are not currently valid or registered with the Domain Name System. An attempt to connect to such a domain name would go undetected if only URL filtering were employed at the HTTP level since in such cases the domain name cannot be resolved into an IP address and hence no HTTP connection can be attempted. A client that is part of a botnet periodically communicates with an associated bot master. To evade detection, domain fluxing may be employed. In such cases, for example, on any given day, a bot may generate DNS queries for a very large number (e.g., hundreds) of domain names of which zero or more may actually be valid or active that day and resolvable into a corresponding IP address of the bot master. Monitoring DNS communications facilitates detection of such behavior and in response one or more appropriate actions may be performed, such as blocking DNS queries for suspect or malicious domain names, learning suspect or malicious domain names, discovering and sanitizing infected clients, etc.

Figure 2:
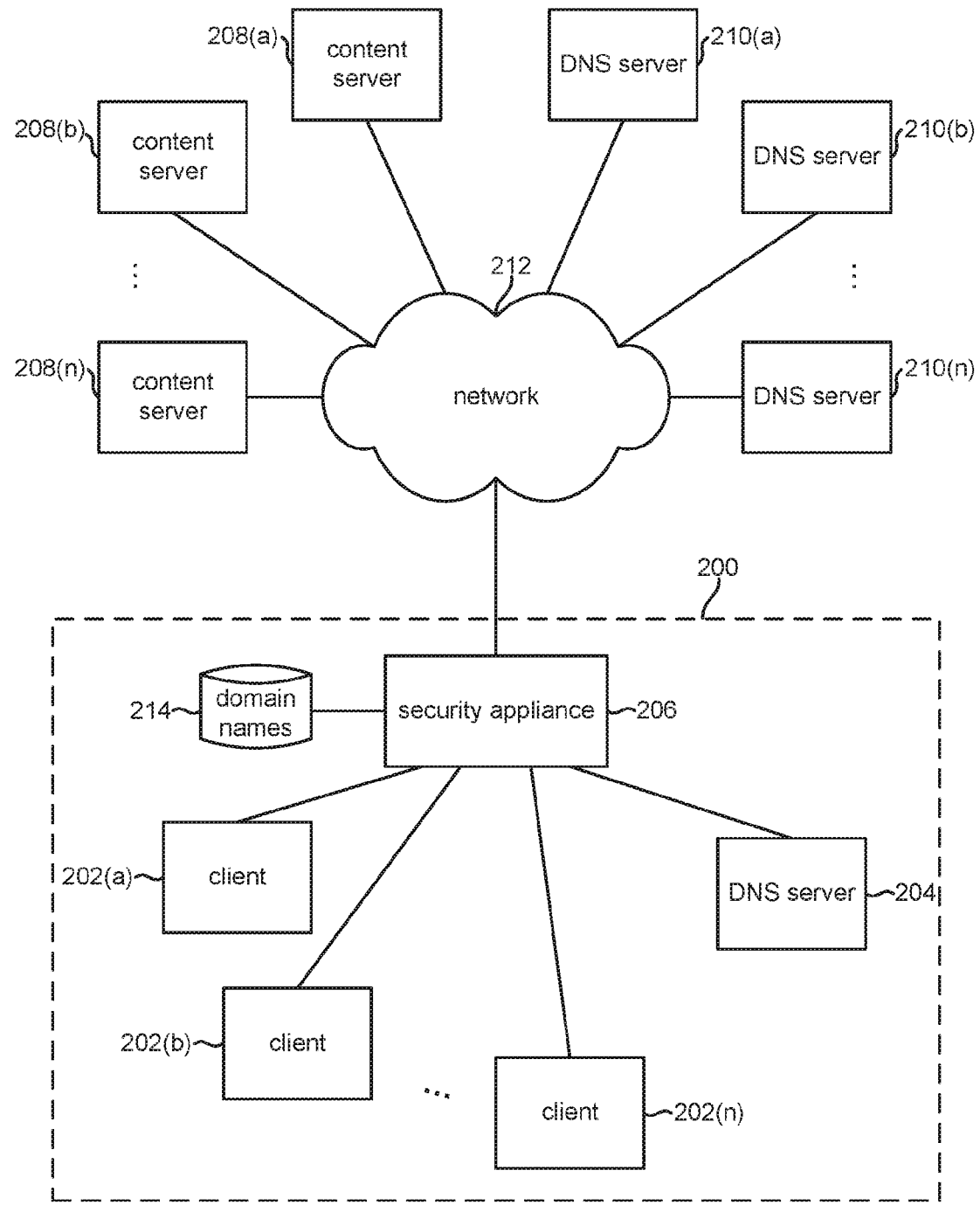
FIG. 2 illustrates an embodiment of a network environment in which DNS communications are monitored and analyzed.

FIG. 2 illustrates an embodiment of a network environment in which DNS communications are monitored and analyzed. Such monitored and analyzed DNS communications may be employed to enforce policies within a private enterprise or corporate network 200. As depicted, enterprise network 200 includes a plurality of client devices 202 as well as an enterprise DNS server 204. One or more of clients 202 may be configured to employ enterprise DNS server 204 for resolving domain names into IP addresses. Communications to and from clients 202 pass through security appliance 206. For example, communications between a client 202 and enterprise DNS server 204 or a client 202 and an external resource such as an external content server 208 or DNS server 210 pass through security appliance 206. Enterprise DNS server 204 may communicate with one or more external DNS servers 210 to resolve a domain name, and such communications between the enterprise and external DNS servers also pass through security appliance 206. Communications between devices internal to enterprise network 200 and those external to enterprise network 200 are facilitated via an external network 212 such as the Internet using any one or more appropriate communication protocols such as HTTP, SSL, FTP, DNS, etc. Communications between various clients 202, DNS servers 204/210, and content servers 208 may be conducted as described with respect to FIG. 1.

In some embodiments, security appliance 206 comprises a firewall configured to enforce policies or rules with respect to various communications that it receives. For example, security appliance 206 may be configured to intercept DNS communications between a client 202, enterprise DNS server 204, and/or an external DNS server 210 as well as to enforce policies based on such communications. Other types of devices may be configured to provide the functionality described herein as being performed by security appliance 206. For example, a router, gateway, intrusion detection system, intrusion prevention system, or other appropriate device may be configured to intercept DNS communications and enforce appropriate policies based on such communications. Although depicted as a separate device in the example of FIG. 2, in other embodiments, security appliance 206 may be implemented directly on a client device 202 as a host-based solution.

As further depicted in FIG. 2, a list or database 214 of domain names is maintained and accessible to security appliance 206. In some cases, database 214 includes a black list of suspect and/or known malicious domain names. Any appropriate indications may be employed to classify domain names as suspect or malicious. For example, a domain name may be classified as suspect or malicious if the domain name is newly registered (e.g., within 30 days) with the Domain Name System, is hosted by a dynamic DNS host service, belongs to a fastflux domain, resolves into the same IP address as an existing known malicious domain name, is unusually long (e.g., is greater than 64 bytes), is hosted by a known malicious DNS server, etc. In some embodiments, database 214 also includes other non-suspect or non-malicious domain names. In some embodiments, domain names included in database 214 are indexed by categories such as malware, social networking, news, sports, entertainment, etc. Different policies may be enforced by security appliance 206 for different categories of domain names, and different users may be subjected to different policies. For example, security appliance 206 may be configured to prohibit all but a select few users who maintain an official presence of the enterprise on social networking sites from accessing social networking sites from within enterprise network 200. Moreover, security appliance 206 may be configured to prohibit any user within enterprise network 200 from accessing a suspect or malicious site such as any domain name that has been categorized as malware in database 214. Database 214 may be populated by domain names known from the public domain or learned, for example, by security appliance 206 and may be updated as new domain names become known. Suspect or known malicious domain names identified as no longer being valid may not be purged or at least immediately purged from database 214, for example, to account for domain name fluxing.

In some embodiments, DNS requests between a client 202, enterprise DNS server 204, and/or an external DNS server 210 are monitored and analyzed by security appliance 206. A DNS request received by security appliance 206 is parsed to extract the domain name of the query. The extracted domain name is compared to the domain names stored in database 214, for example, to determine whether the requested domain name is part of a black list or block list. In some cases, the output of the comparison of the domain name extracted from the request and the database of domain names 214 comprises a category. Based on factors such as the determined category and/or the user or client initiating the DNS request, various actions may be performed by security appliance 206 to enforce enterprise policies. For example, a request for a domain name categorized as a news service may be routed to the DNS server 204 or 210 to which it is directed so that a user/client may access the associated site while a request for a domain name categorized as a social networking site from a user who does not have permission to access such a site may be blocked and not routed to the DNS server 204 or 210 to which it is directed. In some embodiments, a request for a domain name that is part of a block list (e.g., a domain name categorized as social networking) or a black list (e.g., a domain name categorized as malicious or potentially malicious) is blocked and not routed to the DNS server 204 or 210 to which it is directed. Any appropriate response may instead be dispatched to the requesting user or client by security appliance 206. For example, an error or access denied message may be sent to the requesting client. Alternatively, a DNS response may be spoofed by security appliance 206, and a fake DNS response packet may be sent to the requesting client. In some such cases, the spoofed response comprises a non-existent or unavailable IP address.

In addition to blocking access to certain domain names, new suspect or malicious domain names may be learned by security appliance 206 based on received DNS traffic and may be used to update or populate database 214. In addition to DNS requests, in some embodiments, security appliance 206 may likewise be configured to monitor and analyze responses to DNS requests that are received from DNS servers such as DNS servers 204 and 210. For example, if at least a prescribed number of DNS requests for unknown domain names (i.e., domain names not included in database 214) are sequentially received from the same client, the requested domain names may be flagged as suspect or malicious, especially if at least a prescribed number of responses to such DNS requests from one or more DNS servers indicate that the requested domain names are invalid or non-existent. Moreover, suspect behavior by a client (e.g., attempted DNS lookups for a large number of suspect, known malicious, and/or non-existent domain names) may be employed to deduce that the client is compromised and to take corrective actions to sanitize the client.

Figure 3:
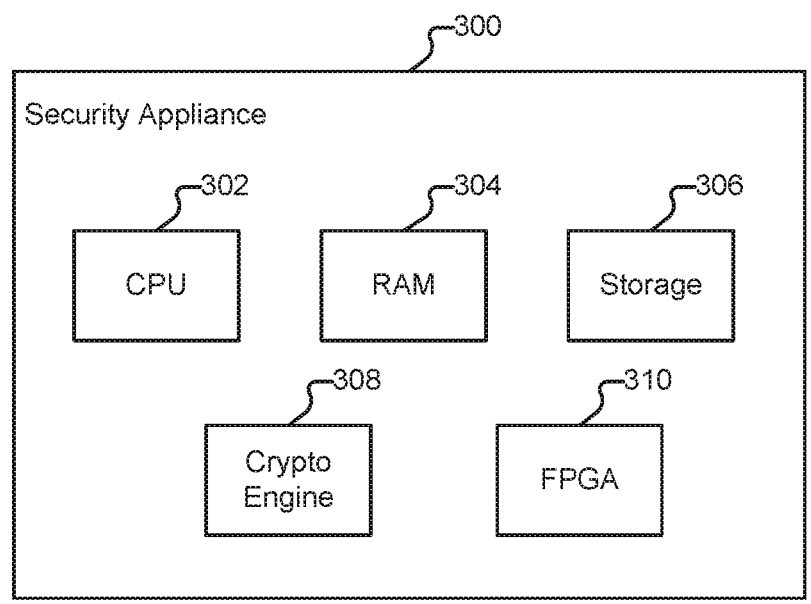
FIG. 3 is a high level block diagram illustrating representations of physical components that may be included in an embodiment of a security appliance.

FIG. 3 is a high level block diagram illustrating representations of physical components that may be included in an embodiment of a security appliance. In some embodiments, security appliance 300 of FIG. 3 comprises security appliance 206 of FIG. 2. In the given example, security appliance 300 includes a high performance CPU (Central Processing Unit) 302 and RAM (Random Access Memory) 304. Furthermore, security appliance 300 includes storage 306 (such as one or more hard disk drives), which may be employed to store policy and other configuration information. In some embodiments, a database of domain names such as database 214 of FIG. 2 is stored in storage 306. Security appliance 300 may also include one or more optional hardware accelerators. For example, security appliance 300 may include a cryptographic engine 308 configured to perform encryption and decryption operations and/or one or more FPGAs (Field Programmable Gate Arrays) 310 configured to perform signature matching, function as network processors, and/or perform other dedicated tasks.

Figure 4:
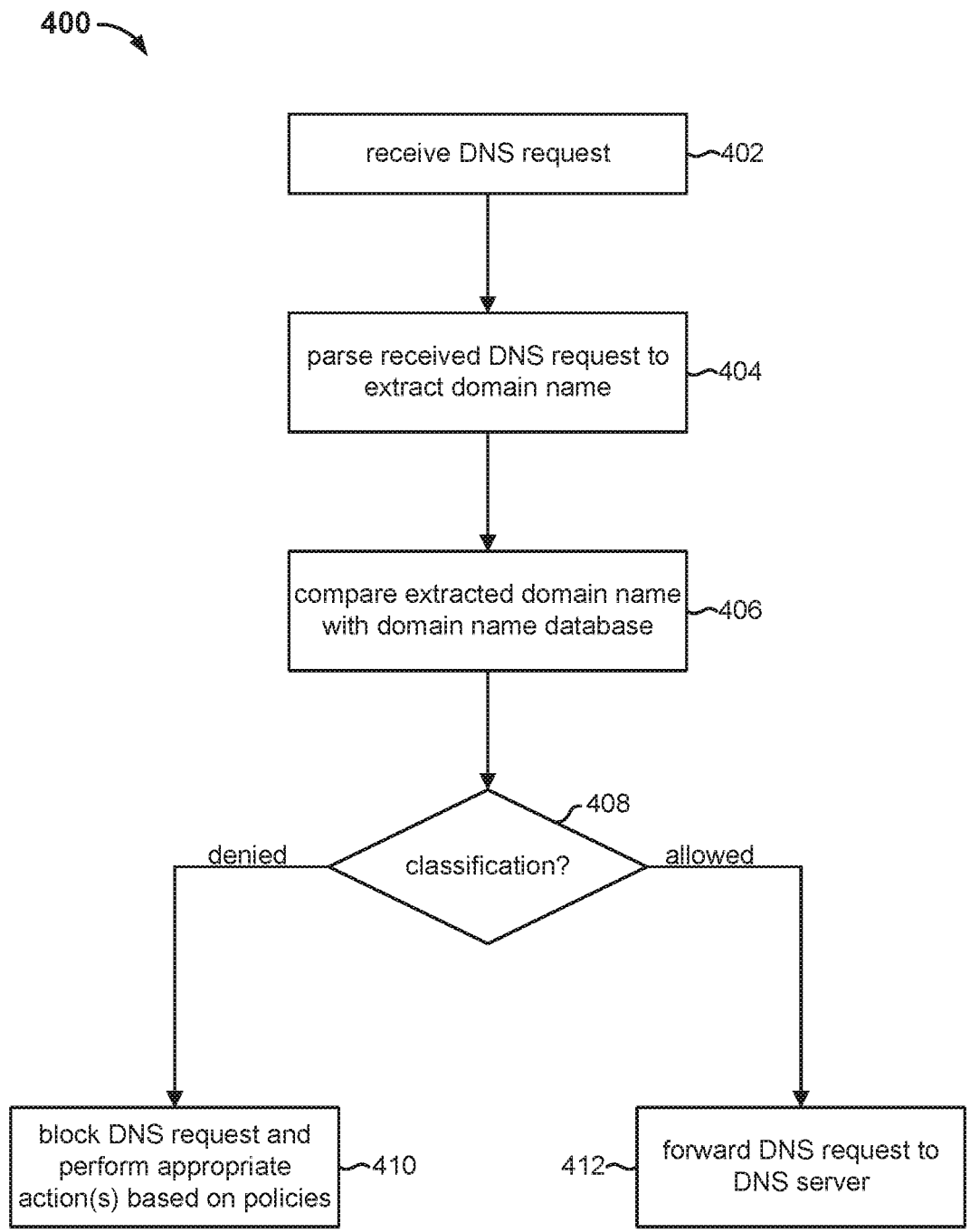
FIG. 4 illustrates an embodiment of a process for employing DNS communications for domain name filtering and for enforcing policies.

FIG. 4 illustrates an embodiment of a process for employing DNS communications for domain name filtering and for enforcing policies. In some embodiments, process 400 of FIG. 4 is employed by a security appliance such as security appliance 206 of FIG. 2 or security appliance 300 of FIG. 3. Process 400 starts at 402 at which a DNS request is received. In some embodiments, the DNS request received at 402 comprises a DNS query from a client such as client 202 of FIG. 2 or an enterprise or corporate DNS server such as DNS server 204 of FIG. 2. At 404, the DNS request received at 402 is parsed to extract a domain name from the request. At 406, the domain name extracted at 404 is compared with or matched against a domain name list or database such as database 214 of FIG. 2. In some embodiments, domain names in such as list or database are organized according to categories. In some such cases, 406 includes identifying or determining a category associated with the extracted domain name. Based on an identified categorization of the extracted domain name, enterprise security or access policies, and/or user permissions, the extracted domain name is classified as denied or allowed at 408. If classified as denied, for example, because the extracted domain name is part of a black list (e.g., is categorized as suspect or malicious) and/or a block list (e.g., is categorized in a category that is prohibited from being accessed), the received DNS request is blocked (e.g., via packet capture), and one or more appropriate actions are performed to enforce associated security and/or access policies at 410. For example, the actions may include sending an error message, sending an access denied message, spoofing a DNS response to the DNS request that comprises a non-existent or invalid IP address, etc. If classified as allowed, for example, because access to the extracted domain name is permitted and/or the extracted domain name is unknown, the received DNS request is forwarded to the DNS server to which it was originally directed at 412. Alternatively, in some embodiments, an extracted domain name is classified as denied if it is unknown, and the DNS request is blocked and appropriate actions are performed at 410.

Since all or at least a significant subset of DNS traffic passes through a security appliance such as security appliance 206 of FIG. 2, such a security appliance provides a suitable point at which to monitor and analyze DNS communications and inject enterprise security and/or access policies. Moreover, domain name filtering based on domain names extracted from DNS communications provides the ability to detect and/or block access to certain domains at an earlier communications stage (e.g., at the DNS stage rather than the HTTP stage). Furthermore, DNS based malware detection and filtering allows suspect and/or malicious domain names as well as infected clients to be identified sooner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    receive a DNS (Domain Name System) request;
    extract a domain name from the received DNS request;
    determine based on a policy that access to the domain name is not permitted; and
    block the DNS request from being transmitted to any DNS server;
    wherein the policy is applied at the DNS communications stage and before the DNS request is transmitted to any DNS server and wherein to determine based on the policy that access to the domain name is not permitted comprises to determine that the domain name is included in a black list; and
  a memory coupled to the processor and configured to provide the processor with instructions.

2. The system of claim 1, wherein the processor is further configured to compare the domain name extracted from the DNS request with a list or database of domain names.

3. The system of claim 1, wherein the processor is further configured to determine a category or classification of the domain name.

4. The system of claim 1, wherein to determine based on a policy that access to the domain name is not permitted comprises to determine that the domain name is included in a block list.

5. The system of claim 1, wherein the black list is part of an enterprise policy for restricting access to a set of domain names.

6. The system of claim 1, wherein the black list is associated with a set of users.

7. The system of claim 1, wherein the black list includes a set of suspect or malicious domain names.

8. The system of claim 1, wherein the processor is further configured to respond to the DNS request with a spoofed DNS response.

9. The system of claim 8, wherein the spoofed DNS response comprises a non-existent or invalid IP (Internet Protocol) address.

10. The system of claim 1, wherein the processor is further configured to respond to the DNS request with an error or access denied message.

11. The system of claim 1, wherein the processor is further configured to determine that a client from which the DNS request is received is compromised.

12. The system of claim 1, wherein the processor is further configured to facilitate sanitizing a client from which the DNS request is received.

13. The system of claim 1, wherein the processor comprises a security appliance or a firewall.

14. A system, comprising:
a processor configured to:
receive a DNS (Domain Name System) request;
extract a domain name from the received DNS request;
determine based on a policy that access to the domain name is not permitted; and
block the DNS request from being transmitted to any DNS server;
wherein the policy is applied at the DNS communications stage and before the DNS request is transmitted to any DNS server and wherein to determine based on the policy that access to the domain name is not permitted comprises to determine that the domain name is unknown; and
a memory coupled to the processor and configured to provide the processor with instructions.

15. The system of claim 14, wherein the processor is further configured to flag the domain name as suspect or malicious.

16. The system of claim 14, wherein to determine based on the policy that access to the domain name is not permitted comprises to determine that at least a prescribed number of DNS requests including the DNS request to resolve unknown domain names have been received from a client.

17. The system of claim 16, wherein the processor is further configured to flag the unknown domain names as suspect or malicious.

18. The system of claim 14, wherein the processor is further configured to respond to the DNS request with a spoofed DNS response.

19. The system of claim 18, wherein the spoofed DNS response comprises a non-existent or invalid IP (Internet Protocol) address.

20. The system of claim 14, wherein the processor is further configured to respond to the DNS request with an error or access denied message.

21. The system of claim 14, wherein the processor is further configured to determine that a client from which the DNS request is received is compromised.

22. The system of claim 14, wherein the processor is further configured to facilitate sanitizing a client from which the DNS request is received.

23. The system of claim 14, wherein the processor comprises a security appliance or a firewall.

24. A method, comprising:
receiving a DNS (Domain Name System) request at a processor;
extracting a domain name from the received DNS request;
determining based on a policy that access to the domain name is not permitted; and
blocking the DNS request from being transmitted to any DNS server;
wherein the policy is applied at the DNS communications stage and before the DNS request is transmitted to any DNS server and wherein determining based on the policy that access to the domain name is not permitted comprises determining that the domain name is included in a black list.

25. The method of claim 24, wherein the black list is part of an enterprise policy for restricting access to a set of domain names.

26. The method of claim 24, wherein the black list is associated with a set of users.

27. The method of claim 24, wherein the black list includes a set of suspect or malicious domain names.

28. The method of claim 24, further comprising responding to the DNS request with a spoofed DNS response.

29. The method of claim 28, wherein the spoofed DNS response comprises a non-existent or invalid IP (Internet Protocol) address.

30. The method of claim 24, further comprising responding to the DNS request with an error or access denied message.

31. The method of claim 24, further comprising determining that a client from which the DNS request is received is compromised.

32. The method of claim 24, further comprising facilitating sanitizing a client from which the DNS request is received.

33. The method of claim 24, wherein the processor comprises a security appliance or a firewall.

34. A computer program product stored on a non-transitory computer readable storage medium and comprising computer instructions for:
receiving a DNS (Domain Name System) request;
extracting a domain name from the received DNS request;
determining based on a policy that access to the domain name is not permitted; and
blocking the DNS request from being transmitted to any DNS server;
wherein the policy is applied at the DNS communications stage and before the DNS request is transmitted to any DNS server and wherein determining based on the policy that access to the domain name is not permitted comprises determining that the domain name is included in a black list.

35. The computer program product of claim 34, wherein the black list is part of an enterprise policy for restricting access to a set of domain names.

36. The computer program product of claim 34, wherein the black list is associated with a set of users.

37. The computer program product of claim 34, wherein the black list includes a set of suspect or malicious domain names.

38. The computer program product of claim 34, further comprising computer instructions for responding to the DNS request with a spoofed DNS response.

39. The computer program product of claim 38, wherein the spoofed DNS response comprises a non-existent or invalid IP (Internet Protocol) address.

40. The computer program product of claim 34, further comprising computer instructions for responding to the DNS request with an error or access denied message.

41. The computer program product of claim 34, further comprising computer instructions for determining that a client from which the DNS request is received is compromised.

42. The computer program product of claim 34, further comprising computer instructions for facilitating sanitizing a client from which the DNS request is received.

43. The computer program product of claim 34, wherein the computer program product comprises a security appliance or a firewall.

44. A method, comprising:
receiving a DNS (Domain Name System) request at a processor;
extracting a domain name from the received DNS request;
determining based on a policy that access to the domain name is not permitted; and
blocking the DNS request from being transmitted to any DNS server;
wherein the policy is applied at the DNS communications stage and before the DNS request is transmitted to any DNS server and wherein determining based on the policy that access to the domain name is not permitted comprises determining that the domain name is unknown.

45. The method of claim 44, further comprising flagging the domain name as suspect or malicious.

46. The method of claim 44, wherein determining based on the policy that access to the domain name is not permitted comprises determining that at least a prescribed number of DNS requests including the DNS request to resolve unknown domain names have been received from a client.

47. The method of claim 46, further comprising flagging the unknown domain names as suspect or malicious.

48. The method of claim 44, further comprising responding to the DNS request with a spoofed DNS response.

49. The method of claim 48, wherein the spoofed DNS response comprises a non-existent or invalid IP (Internet Protocol) address.

50. The method of claim 44, further comprising responding to the DNS request with an error or access denied message.

51. The method of claim 44, further comprising determining that a client from which the DNS request is received is compromised.

52. The method of claim 44, further comprising facilitating sanitizing a client from which the DNS request is received.

53. The method of claim 44, wherein the processor comprises a security appliance or a firewall.

54. A computer program product stored on a non-transitory computer readable storage medium and comprising computer instructions for:
receiving a DNS (Domain Name System) request;
extracting a domain name from the received DNS request;
determining based on a policy that access to the domain name is not permitted; and
blocking the DNS request from being transmitted to any DNS server;
wherein the policy is applied at the DNS communications stage and before the DNS request is transmitted to any DNS server and wherein determining based on the policy that access to the domain name is not permitted comprises determining that the domain name is unknown.

55. The computer program product of claim 54, further comprising computer instructions for flagging the domain name as suspect or malicious.

56. The computer program product of claim 54, wherein determining based on the policy that access to the domain name is not permitted comprises determining that at least a prescribed number of DNS requests including the DNS request to resolve unknown domain names have been received from a client.

57. The computer program product of claim 56, further comprising computer instructions for flagging the unknown domain names as suspect or malicious.

58. The computer program product of claim 54, further comprising computer instructions for responding to the DNS request with a spoofed DNS response.

59. The computer program product of claim 58, wherein the spoofed DNS response comprises a non-existent or invalid IP (Internet Protocol) address.

60. The computer program product of claim 54, further comprising computer instructions for responding to the DNS request with an error or access denied message.

61. The computer program product of claim 54, further comprising computer instructions for determining that a client from which the DNS request is received is compromised.

62. The computer program product of claim 54, further comprising computer instructions for facilitating sanitizing a client from which the DNS request is received.

63. The computer program product of claim 54, wherein the computer program product comprises a security appliance or a firewall.

* * * * *